(No Model.)

J. LITTLE.
CIRCULAR SAW.

No. 528,602. Patented Nov. 6, 1894.

Witnesses:
E. A. Brandau
Wilson D. Bent Jr.

Inventor:
James Little
By John Richards
Atty

UNITED STATES PATENT OFFICE.

JAMES LITTLE, OF SAN FRANCISCO, CALIFORNIA, ASSIGNOR, BY MESNE ASSIGNMENTS, OF ONE-FOURTH TO LARS LARSSON, OF SAME PLACE.

CIRCULAR SAW.

SPECIFICATION forming part of Letters Patent No. 528,602, dated November 6, 1894.

Application filed August 19, 1893. Serial No. 483,555. (No model.)

*To all whom it may concern:*

Be it known that I, JAMES LITTLE, a citizen of the United States, residing in the city and county of San Francisco, State of California, have invented certain new and useful Improvements in Circular Saws; and I hereby declare the following specification and drawings therewith to be a full, clear, and exact description of my improvements.

My invention relates to circular saws having inserted teeth, and consists in forming such teeth with two edges, one parallel to, and one transverse to the plane of rotation, the former severing the fiber when transverse, and slitting it when parallel so the main or chisel teeth require no set, the planing teeth being so formed as to be bent or set parallel to their edges and to the main saw-plate, so that the surfaces of wood sawed are left smooth and true.

The object of my invention is to attain a more rapid and better performance with less power, and at the same time produce surfaces that are true and smooth, as will be hereinafter more fully pointed out and explained; also accomplish a saving by reason of a narrower kerf, which my improvements permit.

Figure 1:
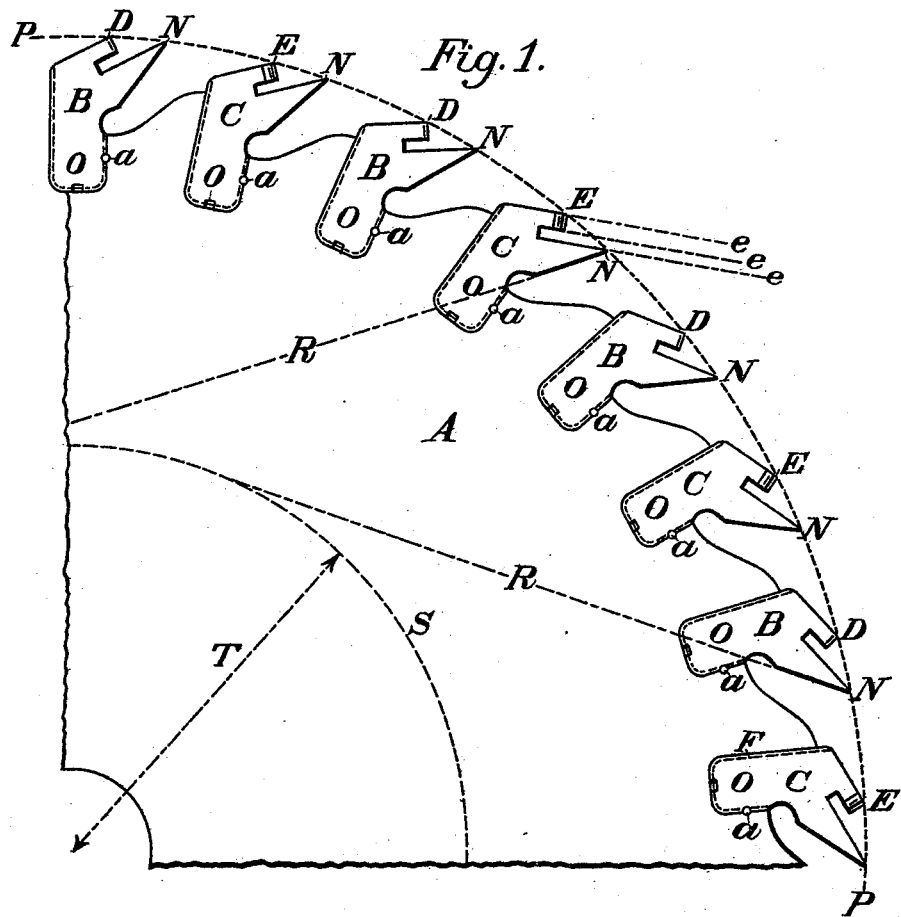
Figure 2:
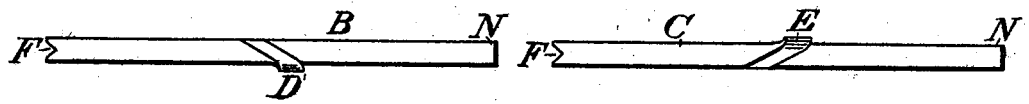
Figure 3:

Referring to the drawings: Figure 1 is a quadrant section of a circular saw fitted with my improved inserted teeth. Figs. 2 and 3 are enlarged edge views on the top of two of the teeth detached, showing the manner of setting the planing teeth right and left.

The same letters are employed to designate like parts in the different figures.

The main saw plate A is cut out in the usual manner to receive the teeth B and C which are identical except as to the bevel or set of the spur teeth D and E, which are bent right and left as shown in Figs. 2 and 3. These saw teeth B and C have an angular groove around their shanks, or that portion fitting into the saw blade A, as shown at F in Figs. 2 and 3, and when inserted are fastened by means of rivets $a$, in the usual manner.

As the inserted shanks O of the teeth do not require special modification, I form these so as to fit into saw plates prepared to receive any of the common forms of inserted teeth, so my improvements can be applied to saws in use without altering the main plate.

The inserted teeth B and C are made with dual points or edges E and N, or D and N, the latter being thin chisel points, with the edges transverse to the plane of rotation, and other teeth E and D with their edges parallel to the plane of rotation, the tips in each case reaching to the line P, or the extreme periphery. This permits the spur or planing teeth D and E to act first, because of the feed or forward progress of the wood, which takes place in the interval of passing between the points E and N, or D and N, so the shaving cut away by the chisel teeth N is first severed at the sides, so that no set is required in the teeth N, and the saw will act equally well transverse to the grain or parallel thereto, consequently is not disturbed or deflected in cutting through knots, burls, or at any angle of the wood.

The double teeth E N and D N are formed integrally, arranged as shown to give free access on all sides for filing or grinding, and as the work is equally divided between them, the wear is also uniform, and the saws remain round and true when in use.

The faces of the chisel teeth N I set on an angle R, tangential to a circle S, which is in the center of the saw's radius, or in other words, the radius T is one fourth the saw's diameter.

The faces $e\ e\ e$ I preferably make parallel for convenience in dressing, and because in this form the sections and distribution of the metal afford full strength.

The set of the teeth shown in Figs. 2 and 3 is exaggerated in order to show more clearly the arrangement of the teeth in this respect.

I am aware that planing teeth for wood saws are well known, but in such saws as commonly made, the planing teeth are not in such form as will permit a bending parallel to their edges and hence must be set by a swage, but in my invention the teeth are so formed as to be bent uniformly for the whole depth and thus set parallel to their cutting edges.

Having thus described the nature and objects of my invention, what I claim as new, and desire to secure by Letters Patent, is—

In a saw, the insertible teeth B and C, having shanks which are inserted into recesses in the saw-plate, said teeth B, having the points D and N, and said teeth C having the points E and N, these teeth B and C being arranged to alternate with each other, and the points N being thin chisel points with their edges transverse to the plane of rotation of the saw, while the points E and D are so formed as to operate as planing teeth and are separated from their companion points N by an intervening rectangular throat, as shown, which permits said points E and D to be bent or set parallel on their edge to the main saw-plate, said points E D having likewise their edges parallel to the plane of rotation, the points E projecting in opposite directions from that of the points D, substantially as shown, and all of the tooth-points occupying forwardly-inclined positions substantially parallel to each other and with their outer ends in substantially the same circular line, substantially as described.

In testimony whereof I have hereunto affixed my signature in the presence of two witnesses.

JAMES LITTLE.

Witnesses:
ALFRED A. ENQUIST,
WILSON D. BENT, Jr.